United States Patent

[11] 3,555,240

[72] Inventors Karl Gloor
Zollikon,
Hans Baach, Niederglatt, Switzerland,
Hans Dieter Jacubasch, Eisenberg, Rudolf
Stein, Neuleiningen, and Hans Dieter
Erhard, Frankenthal, Germany
[21] Appl. No. 684,157
[22] Filed Nov. 20, 1967
[45] Patented Jan. 12, 1971
[73] Assignee Elektrodenfabrik Oerlikon Buhrle AG
Zurich, Switzerland
a corporation of Switzerland
[32] Priority Nov. 23, 1966
[33] Switzerland
[31] No. 16765/66

[54] FILLED WELDING ROD
2 Claims, 4 Drawing Figs.
[52] U.S. Cl. .................................................. 219/146
[51] Int. Cl. .................................................. B23k 35/22
[50] Field of Search ........................................... 219/146,
146.6, 162

[56] References Cited
UNITED STATES PATENTS
1,363,636 12/1920 Brace .......................... 219/146
1,709,474 4/1929 Hawley ....................... 219/146.6
2,023,364 12/1935 Crapo ......................... 219/146

Primary Examiner—A. Bartis
Assistant Examiner—Lawrence A. Rouse
Attorney—Werner W. Kleeman ABSTRACT: Filled-welding rods comprising basically seamless or circumferentially continuous metallic sheath or jacket and a filling material of a welding powder which may include mixtures of deoxidation and alloying substances, slag formers and, if desired, iron powder. The jacket or sheath is gas tight to protect the filling material against environmental moisture and the like. A large variation in the ratio between external diameter of the welding rod and wall thickness of the sheath or jacket may be provided. The sheath or jacket may be coated or plated with another metal such as copper.

PATENTED JAN 12 1971    3,555,240

INVENTORS
Karl Glove,
Hans Bauch,
Hans Dieter Jacubasch
Rudolf Stein, and
Hans Dieter Erhard BY  Jacobi & Davidson
ATTORNEYS

FILLED WELDING ROD

BACKGROUND OF THE INVENTION

The present invention relates to an improved filled rod or wire for use in welding.

In semiautomatic and automatic welding of metals with consumable welding electrodes there have been employed welding electrodes in the form of long wires due to the continuous nature of feeding during the welding operation. These welding wires or rods generally consist of a metallic casing or sheath having an external diameter of 0.5—4 millimeters and a filling formed of a powdery or pulverulent material. They are commercially available in lengths of at least 100 meters and are wound upon spools or the like. The wound welding rods or wires are guided during welding by means of an apparatus having adjustable feed through a guide and insulating hose to a welding gun arranged over the material to be welded. The welding gun is electrically coupled with a welding transformer. The electric current required for welding is conducted to the welding rod or wire through the agency of current supply jaws which are pressed against such rod by springs or the like.

Previously a thin sheet metal band was employed for the fabrication of welding wires or rods. This sheet metal band was formed into a U-shaped trough during a first working operation. In a second working operation the trough was filled with a welding flux or powder. Thereafter, the marginal portions of the trough were bent or flexed together in at least one further working operation until there was obtained mutual contact along their edges. The filled wire produced in this manner was generally drawn through one or a number of drawing nozzles, so that the cross section of the wire was reduced and the welding powder located therein was compacted or compressed. However, the obtainable reduction in cross section was relatively small because the flexed wire tended to split along the marginal portions.

Naturally, the rolled together ends of the U-shaped trough do not form tight enclosure or sheathing for the welding powder and air and moisture can contact the welding powder which is generally at least sensitive to moisture. This reduces the storage capability of the welding wire if no special measures are undertaken. Additionally, such welding wires or rods cannot be strongly deformed or worked and also cannot be wound upon rolls of small diameter without the sheathing opening. Furthermore, the surface of the welding wire can oxidize and corrode during the longer periods of storage. This then increases the transfer or passive resistance between the current supply jaws of the welding gun and the welding wire and limits the utilized welding current. A higher transfer resistance causes a more pronounced development of heat at the welding gun and with too strong a heating of the current transfer locations it is possible, in fact, for the current supply jaws to be welded with the welding wire. Treatment of the surface of the welding wire in order to improve its electrical conductivity and corrosion resistance, for which purpose with modern technology only a wet treatment would be considered for reasons of economy, such as, for instance, galvanic copperplating, cannot be carried out with such prior constructions due to the danger of the entry of liquid into the welding powder.

Finally, for a high melting or fusing efficiency, which is defined as the weight of welding metal deposited per unit of time, it is essential that the welding wire or rod be preheated to as high a temperature as possible. However, a welding rod or wire which has been produced from a sheet metal band tends to split open along the impact locations of its edges upon exceeding a predetermined temperature. Since the preheating temperature and the length of the welding wire protruding out of the welding gun are approximately proportional to one another, with the previously employed welding wires this length generally could not exceed approximately 30 millimeters.

It should be understood that a great number of attempts have been undertaken in order to at least partially overcome the previously explained disadvantages. For instance, the marginal regions or edges of the sheet metal band which are flexed towards one another have been completely or in a single fold mechanically connected with one another. However, in so doing it was not possible to obtain more than a slight improvement. Furthermore, so-called double folds have become known in the art which were obtained by carrying out a further folding or flexing of the single fold. Still, this mechanically complicated connection of the ends of the sheet metal strips does not insure against rupturing or splitting during bending, nor is it capable of effectively protecting the enclosed welding powder.

SuMMARY OF THE INVENTION

Accordingly, it is a primary object of the present invention to effectively overcome the aforementioned drawbacks.

More specifically, it is a basic object of the instant invention to provide a filled welding rod which will not be split open during bending or subjection to elevated temperatures. Furthermore, this invention provides a filled-welding rod wherein the filling material is protected from environmental moisture or the like and wherein the metallic sheath or jacket is covered with a copperplating to protect the same against oxidation and corrosion and to reduce transfer resistance between the current supply jaws and the welding wire to a minimum thereby increasing the maximum welding current and providing for optimum preheating of the end of the welding wire.

An important object of the instant invention is the provision of a filled-welding rod wherein the ratio of the external diameter of the finished product to the thickness of the tube wall and thus the ratio of the material of the tube to the material of the filling can be varied within wide ranges.

Now, in order to implement these and still further objects of the invention, which will become more readily apparent as the description proceeds, the filled-welding rod or wire produced according to the teachings of the invention is characterized by embodying a seamless metallic casing or jacket and a powdery filling containing at least one welding powder.

The term "seamless" as used herein and in the appended claims shall be understood to refer to a circumferentially continuous jacket or sheath as distinguished from the flexed or abutting relationship of some prior art constructions of the type described hereinabove and the folded-edge arrangements of other prior art constructions of the type described hereinabove. On the other hand, this term shall be understood to include a jacket or sheath extruded or otherwise formed as a continuous tube as well as jackets or sheaths in which the longitudinal edges have been welded together to form a continuous tube.

According to a preferred embodiment of the invention, the external surface of the welding wire is galvanically copperplated.

With the inventive welding rod it is possible to effectively protect the enclosed welding powder against air and moisture owing to the casing or jacket which is closed about its periphery. Furthermore, it is possible to stress anneal the welding rod after drawing in order to improve its workability and it is also possible to carry out, without detrimentally affecting the welding powder, a wet, for example, galvanic, surface treatment in order to apply a protective layer against oxidation and The galvanically applied metallic layer can furthermore reduce the transfer resistance between the current supply jaws and the welding wire to a minimum and thereby renders possible an increase of the maximum welding current and at the same time an optimum preheating of the end of the welding wire protruding out of the welding gun as well as an optimum delivery of the available current to the arc. This in turn brings about melting efficiencies which are far above those which were previously possible. Finally, the inventive welding wire can be considerably deformed before the sheathing or casing tends to become brittle or cracked.

It has been found that when drawing a tube filled with a powdery material through a drawing nozzle with the thus brought about reduction of the external diameter, initially with practically constant wall thickness, the inner diameter of the tube is reduced, that is to say, there occurs a compaction or compression of the powdery material. As soon as a certain compaction has been obtained, with further drawing and with approximately constant density of the powdery material, the external diameter of the tube is reduced practically in proportion to the wall thickness.

The welding powder which is locate in the welding rod or wire generally consists of a mixture of deoxidation and alloying substances, slag formers and, if desired, iron powder. Depending upon the proportions of its components, it can react either basically or acidically. With an increased addition of basic slag formers there results, for instance, a basic welding powder which provides a welded seam with increased notch toughness. On the other hand, when utilizing acidic slag formers the welded seam has a better appearance owing to the improved flowability of the molten metal, but possibly exhibits somewhat poorer mechanical properties.

BRIEF DESCRIPTION OF THE DRAWINGS

The invention will be better understood, and objects other than those set forth above, will become apparent, when consideration is given to the following detailed description relating to the inventive welding rod. Such description makes reference to the annexed drawing wherein.

DESCRIPTION OF THE PREFERRED EMBODIMENTS

Figure 1:
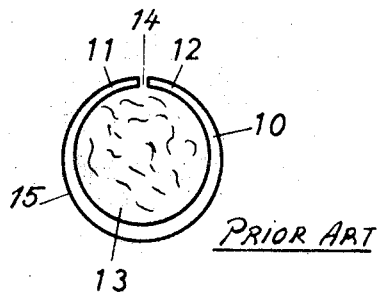
FIG. 1 schematically illustrates a sectional view through one type of prior art welding rod or wire with the edges of the sheath or jacket rolled together.

Referring now to the drawing in general, and more particularly to FIG. 1, there is shown in an enlarged cross-sectional view an embodiment of a conventional welding rod or wire which is formed of a sheet-metal strip or strip stock 10. In so doing, the marginal portions or edges 11 and 12 of the sheet-metal strip 10 are flexed together in such a manner that they contact one another and the sheet-metal strip 10 forms a tube 15. The interior of this tube 15 is filled with a welding powder 13. However, it should be recognized that the edges along which the marginal portions 11 and 12 contact do not provide a tight enclosure of the welding powder 13, but rather leave open a clearly visible gap 14 which can not help but open when the welding wire is strongly bent or flexed.

Figure 2:
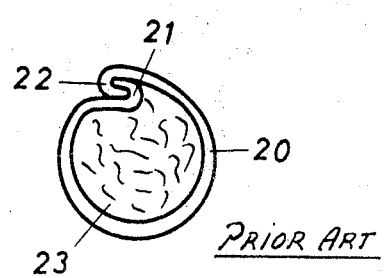
FIG. 2 schematically illustrates a sectional view through another prior art-welding rod or wire with the edges of the sheath connected together by a fold.

FIG. 2 is a cross-sectional view through a further embodiment of prior art welding wire in which the edges or marginal portions 21 and 22 of a sheet-metal strip 20 are folded. In this regard it will be seen that the one marginal portion 21 is flexed in counterclockwise direction towards the outside and the other marginal portion 22 in clockwise direction towards the inside. Both of the oppositely directed folds are hooked or interengaged with one another and are pressed into one another by drawing the wire through at least one drawing nozzle.

It will be readily recognized from FIGS. 1 and 2 that the ratio or relationship of the cross section of the filling material 13 and 23 to the wall thickness of the sheet-metal band 10 and 20 respectively, can only be changed within narrow limits. In particular, the welding wire of the type shown in FIG. 2 can only be manufactured from relatively thin sheet-metal stock owing to the folds, and this is not advantageous when pure welding powder is used as the filling for certain applications. According to the instant invention, the ratio of external diameter of the final product to wall thickness of the tube can be varied, for example, from 3:1 to 20:1.

Figure 3:
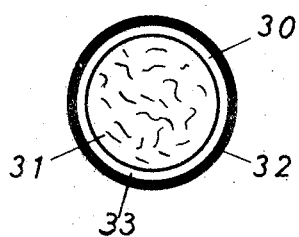
FIG. 3 schematically illustrates a sectional view through one embodiment of an inventive welding rod on the surface of the jacket or sheath of which there is applied a further metallic layer.

FIG. 3 shows a cross-sectional view through an embodiment of inventive welding wire incorporating a metallic sheath or jacket 30 which is constructed as a seamless tube 33. This sheath 30 may possess a uniform wall thickness of approximately 0.3 millimeters and an external diameter of approximately 2.0 millimeters. It is covered with a galvanically applied copper layer 32. The filling 31 which is enclosed within the sheath 30 so as to be airtight and moistureproof contains a mixture of a welding powder and iron powder.

Figure 4:
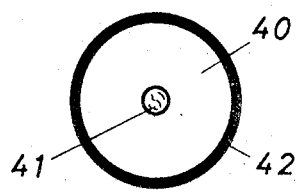
FIG. 4 schematically illustrates a sectional view through a further embodiment of an inventive welding rod or wire having a relatively large wall thickness of the jacket or sheath.

The modified embodiment of inventive welding rod or wire depicted in FIG. 4 possesses an extremely thick metallic sheath or jacket 40. In this exemplary embodiment the wall thickness of the sheath 40 may amount to 1.2 millimeters with an external diameter of 3.0 millimeters. Consequently, the filling 41 possesses an extremely small cross section and consists of pure welding powder without the addition of iron powder. Also, in this embodiment, a copper layer 42 is electrolytically applied to the sheath 40.

The invention will be now further explained with regard to the following Examples.

EXAMPLE 1

Let it be assumed that it is desired to produce a filled-welding rod or wire with an external diameter of 2.4 millimeters and whose filling delivers an acidic slag and an analysis of the material to be welded which contains 1.5 percent manganese and 0.5 percent silicon.

In order to be able to draw filled-welding wires with sufficient safety their wall thickness should not be smaller than about 0.3 millimeters. Accordingly, for the welding wire with the required external diameter of 2.4 millimeters there has been assumed a wall thickness of 0.38 millimeters, from which there can be calculated a cross-sectional ratio of the sheath or jacket to the internal area of about 1.1:1. This ratio at the same time corresponds to the volume ratio of the sheath to the volume of the filling material within the welding wire. However, as is well known to those skilled in the art, a welding wire or a rod in which the volume ratio of the iron of the sheath to the welding powder of the filling is about 1.1:1 will exhibit too high a proportion of welding powder. Consequently, in this case, the welding powder has iron powder added thereto. For a volume ratio of 1.1:1 a usable mixture of welding powder to iron powder contains, for instance, 14 percent deoxidation and alloying substances, 9 percent slag formers and 77 percent iron powder and has a bulk or compacted density of about 3.0.

A commercially available welded iron tube of 12 × 1.8 millimeters is used as the starting material for the sheath or tubular casing. Such material is commercially available in length of up to 500 meters. A piece having a length of about 100 meters is separated therefrom and wound onto a first drum. Then, in order to clean the inside of the tube from possible welding residues, fine steel scrap is blown through the tube at high pressure. Further, in order to remove fat and other soluble impurities, the interior of the tube is washed with trichloroethylene or other suitable solvent or degreasing material. Thereafter the tube is checked for tightness by compressed air which is at 100 atmospheres absolute pressure.

The thus-cleaned empty tube is then drawn through a first drawing nozzle, whereby the external diameter of the tube is reduced with practically constant wall thickness. The dimensions of the drawing nozzle are chosen such that the ratio of the external diameter to the wall thickness of the empty drawn tube is approximately equal to the corresponding ration ratio or relationship of the desired finished welding wire or rod, in the present case, approximately 11.4 × 1.8 millimeters to provide a 1.1:1 ratio. Directly after the drawing nozzle, the empty tube is advantageously wound upon a drum, whereby the force necessary for drawing the tube through the drawing nozzle is utilized for winding the tube upon the drum so that it cannot move.

If the compacted or stamped volume of the filling powder and the dimensions of the tube which is to be filled are known, then it is easily possible to calculate the quantity of filling powder which is required for filling the tube to a density which corresponds to the compacted volume. In the present case, when the tube is 100 meters long, and with a compacted density of 3.0, 14.4 kilograms of powder would be needed.

The drum with the tube wound thereon in slip-free or immovable manner is then secured in a position wherein its axis is vertical on a horizontal shaking or jarring table. This horizontal jarring table can be jarred about a vertical axis which is arranged outside of the center of the table. A free end of the tube is flexed upwardly and connected via a flexible hose with a funnel-shaped discharge of a container in which there is located the previously determined quantity of filling powder. As soon as the jarring table is placed in operation and the drum together with the slip-free wound tube which has been secured onto such table is jarred, the filling powder will be jarred out of the container into the tube. In so doing, it has been found that the density of the filling in the tube which has been achieved in this manner corresponds exactly to the bulk or compacted density.

After all of the previously determined powdery material has been jarred into the tube, the drum is dismantled from the jarring table and the wound tube is drawn through a number of serially arranged drawing nozzles. Once the filling has been further compressed by one or more of the drawing nozzles to a predetermined degree, upon further drawing, and due to the compressive strength of the filling within the tube, the external diameter of the tube will be reduced practically in proportion to the wall thickness.

After the tube has been drawn down to an external diameter of about 5 millimeters it is again wound upon a drum and together with this drum is annealed so as to be free of stress in a furnace in the presence of a protective gas. Thereafter, the tube is once again drawn through two further drawing nozzles until its external diameter has reached the required 2.4 millimeters.

The filled tubular wire or rod is then conducted through a chemical bath in a manner known to those skilled in the art and thereby freed of possible oxidation and lubricating residues. Thereafter, it is conducted through an electrolytic copper bath and coated with a fixedly adhering copper layer.

The finished welding rod or wire can then be subdivided into sections of optional length in order to be used.

For a further understanding of the manufacturing technique described in Example 1, reference may be made to copending application Ser. No. 684,158, entitled "METHOD FOR THE PRODUCTION OF A SEAMLESS TUBULAR WIRE FILLED WITH A POWDERY MATERIAL," filed on an even date herewith in the names of the same inventors. The disclosure of this application is incorporated herein in its entirety by reference.

As pointed out in that application, the grain or particle size of the powdery material is preferably not greater than the wall thickness of the final tube, a particle size of less than 0.5 millimeters, e.g., 0.3 millimeters, being particularly desirable. If the individual compounds of the powder mixture exhibit markedly different densities, then it is advantageous to agglomerate such larger particles with the addition of a binding agent such as, for example, water glass. In this instance, the particle or grain size of the agglomerated material is preferably not greater than twice the wall thickness of the final tube, a particle size of less than 1.0 millimeters, e.g. 0.7 millimeters, being desirable.

EXAMPLE 2

Let it now be assumed that it is desired to produce a welding wire or rod with an external diameter of 1.2 millimeters, whose filling delivers an acidic slag and an analysis of the material to be welded which contains 1.5 percent manganese and 0.5 percent silicon. With the assumption that this welding wire or rod because of its small external diameter should advantageously, also for reasons of drawing technology, possess the smallest possible wall thickness of 0.3 millimeters, there can be calculated a cross-sectional ratio of the wall thickness of the sheath to the inner or filling area of 3:1. A welding rod or wire whose sheath volume in relation to the filling volume is so large, should, according to practical experience, no longer contain any more iron powder in the filling. Rather, it is advantageously filled with a material containing 45 percent deoxidation and alloying substances and approximately 55 percent slag formers. Such a filling possesses a bulk or compacted density of about 2.0.

If there is employed the same starting tube with an external diameter of 12 millimeters and a wall thickness of 1.8 millimeters which is mechanically cleaned and removed of fat in accordance with the procedures of Example 1, then this tube must be drawn in at least a first drawing operation to an external diameter of 7.2 millimeters with approximately constant wall thickness, so that the cross-sectional dimensions of the empty tube correspond approximately to that of the desired finished welding wire or rod. The quantity of filling powder which is necessary for filling this predrawn and likewise 100 meters long tube, is 2 kilograms from the known cross section of the filling area or space and the bulk or compacted density of the powder having the above-mentioned composition. This powder is then jarred into the tube in the same manner as already described with regard to Example 1, whereupon the tube is further drawn to provide the desired external diameter of 1.2 millimeters in a manner which has likewise previously been described. The finished welding wire or rod is then galvanically copper-plated.

While there is shown and described presently preferred embodiments of the invention, it is to be distinctly understood that the invention is not limited thereto, but may be otherwise variously embodied and practiced within the scope of the following claims. ACCORDINGLY,

We claim:

1. A filled welding wire comprising a metallic jacket having an external diameter in the range of 0.5 to 4 mm. and a filling containing at least a welding powder, said filling being composed of agglomerated powdery materials having a particle size of less than 1 mm., said powdery materials being agglomerated in order to protect against separation, said metallic jacket comprising a seamless tube with the ratio of its external diameter to its wall thickness being greater than 3 to 1, said seamless tube being coated with galvanically applied copper, said filling being composed of a mixture of materials selected from the group of deoxidation and alloying substances, and slag formers.

2. A filled-welding wire as defined in claim 1, wherein said filling further contains iron powder.